United States Patent
Freiband et al.

(10) Patent No.: US 12,470,402 B2
(45) Date of Patent: Nov. 11, 2025

(54) IN-PERSON ELECTRONIC SIGNATURE WITH MOBILE DEVICES

(71) Applicant: Frienda Co., Ann Arbor, MI (US)

(72) Inventors: Benjamin Freiband, Ann Arbor, MI (US); Max Albert, Ann Arbor, MI (US); Chase Winovich, Jefferson Hills, PA (US); Maximilian Grasso, Jacksonville, FL (US); Maksim Tyrpych, Seekonk, MA (US)

(73) Assignee: Frienda Co., Ann Arbor, MI (US)

( * ) Notice: Subject to any disclaimer, the term of this patent is extended or adjusted under 35 U.S.C. 154(b) by 91 days.

(21) Appl. No.: 18/488,933

(22) Filed: Oct. 17, 2023

(65) Prior Publication Data
US 2024/0129133 A1   Apr. 18, 2024

Related U.S. Application Data

(60) Provisional application No. 63/417,122, filed on Oct. 18, 2022.

(51) Int. Cl.
*H04L 9/32* (2006.01)
*G06K 19/06* (2006.01)

(52) U.S. Cl.
CPC ...... *H04L 9/3247* (2013.01); *G06K 19/06037* (2013.01)

(58) Field of Classification Search
None
See application file for complete search history.

(56) References Cited

U.S. PATENT DOCUMENTS

| | | | |
|---|---|---|---|
| 2008/0172413 A1* | 7/2008 | Chiu | G06F 16/4387 |
| 2013/0221083 A1* | 8/2013 | Doss | G06F 16/9554 |
| | | | 235/375 |
| 2013/0221084 A1* | 8/2013 | Doss | H04W 12/06 |
| | | | 235/375 |
| 2015/0067347 A1* | 3/2015 | Dease | H04L 9/3247 |
| | | | 713/176 |
| 2018/0270070 A1* | 9/2018 | Altman | H04L 9/3247 |
| 2020/0204377 A1* | 6/2020 | Wisniewski | G06F 21/34 |
| 2020/0322351 A1* | 10/2020 | Jadav | H04W 12/106 |
| 2021/0112057 A1* | 4/2021 | Secunda | H04W 12/104 |
| 2022/0092161 A1* | 3/2022 | Keith, Jr. | G06F 21/35 |

* cited by examiner

*Primary Examiner* — Scott B Christensen
(74) *Attorney, Agent, or Firm* — Foley & Lardner LLP

(57) ABSTRACT

Techniques for in-person electronic signatures using mobile devices are disclosed. A method includes generating a code corresponding to an electronic document. The code may include a device identifier associated with a first device. The method may include receiving a request from a second device that scanned the code. The method may include receiving metadata received in response to input at the second device in response to determining that a proximity of the first device to the second device satisfies a threshold using network information. The method may include modifying the electronic document based on the metadata.

20 Claims, 13 Drawing Sheets

200D
NDA 1/23/2022 ✏
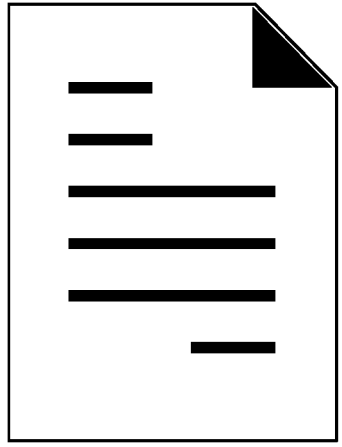
Expand
Share
Change Name
View Co-Signer(s)
eSign document
Back to Home
FIG. 2D

200E

2001
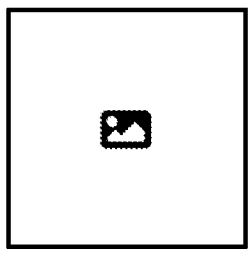
Touch Phones to Finalize Signatures
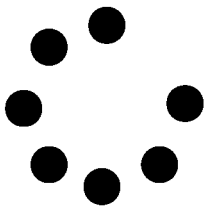
Alternatively Send Via Email:
| example2@example2.com |
| Send Email |
Back
FIG. 21

IN-PERSON ELECTRONIC SIGNATURE WITH MOBILE DEVICES

CROSS-REFERENCE TO RELATED APPLICATIONS

This application claims priority to U.S. Provisional Patent Application No. 63/417,122, filed Oct. 18, 2022, which is incorporated herein by reference in its entirety for all purposes.

TECHNICAL FIELD

The present application relates to the field of electronic signatures.

BACKGROUND

Electronic signatures have become more popular, in part due to the increased use of electronic documents. Other approaches to electronic signatures are typically performed remotely over email, requiring several onboarding steps. In contrast, users want to ensure that electronic signatures can be performed quickly on an as-needed basis, without a lengthy onboarding process while still ensuring the security of the signing process.

One technical problem faced by conventional electronic signature systems is that, due to their remote configuration, it is challenging to ensure the authenticity of the electronic signatures. For example, it is challenging to guarantee the identity of the person actually performing the electronic signature is the desired signor, rather than an imposter.

SUMMARY

The systems and methods described herein provide techniques that enable in-person electronic signatures using mobile devices, without requiring a lengthy on-boarding process. An electronic signing process for an electronic document can be initiated by a first mobile device that displays a code that is scanned by a second mobile device of a co-signor. The code can include information that enables the second mobile device to communicate wirelessly with the first mobile device to perform the electronic signature. Local wireless communication ensures that the mobile devices, and therefore each signor, are in close proximity, which solves the issue of authenticity faced in other electronic signature processes. Upon receiving an input to sign the electronic document, the second mobile device can transmit metadata including information about the electronic signature to the first mobile device wirelessly. The first mobile device can then modify the electronic document to indicate the electronic signature. The modified electronic document can be transmitted to the second mobile device wirelessly or via another communication process, such as e-mail or an electronic messaging service.

One embodiment is directed to a method. The method includes generating a code corresponding to an electronic document, where the code includes a device identifier associated with a first device. The method includes receiving a request from a second device that scanned the code. The method includes receiving metadata received in response to input at the second device in response to determining, using network information, a proximity of the first device to the second device satisfies a threshold; and modifying the electronic document based on the metadata.

The code may include an identifier of the electronic document. The code may be a quick-response (QR) code, and the method may further include presenting the QR code at a display device. Determining the proximity of the first device to the second device may include detecting the second device using a wireless communication protocol. Determining the proximity of the first device to the second device may be based on an internet protocol (IP) address of the second device.

The method may include transmitting the code in an electronic message. The method may include transmitting the electronic document to a remote server responsive to modifying the electronic document. The code may include a uniform resource locator (URL) that causes the second device to retrieve and execute an application that transmits a connection request to the first device. The metadata may include one or more of a location of the second device, an identifier of the second device, and a timestamp of the input at the second device. Modifying the electronic document may include generating a digital fingerprint based on the metadata; and embedding the digital fingerprint in the electronic document.

Another embodiment is directed to a system. The system can include a first device comprising one or more processors coupled to a non-transitory memory. The system can generate a code corresponding to an electronic document. The code can include a device identifier associated with the first device, and receive a request from a second device that scanned the code. In response to determining, using network information, that a proximity of the first device to the second device satisfies a threshold, the system can receive metadata received in response to input at the second device. The system can modify the electronic document based on the metadata.

The code may include an identifier of the electronic document. The code may be a quick-response (QR) code. The system may present the QR code at a display device. The system may determine the proximity of the first device to the second device by performing operations comprising detecting the second device using a wireless communication protocol. The system may determine the proximity of the first device to the second device based on an IP address of the second device.

The system may transmit the code in an electronic message. The system may transmit the electronic document to a remote server responsive to modifying the electronic document. The code may include a URL that causes the second device to retrieve and execute an application that transmits a connection request to the first device. The metadata may include one or more of a location of the second device, an identifier of the second device, and a timestamp of the input at the second device. The system may modify the electronic document by performing operations include generating a digital fingerprint based on the metadata; and embedding the digital fingerprint in the electronic document.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure. For purposes of clarity, not every component may be labeled in every drawing. In the drawings:

FIGS. 2A to 2K illustrate example graphical user interfaces of applications that may implement one or more of the techniques described herein, according to an embodiment;

DESCRIPTION OF PREFERRED EMBODIMENTS

Figure 1:
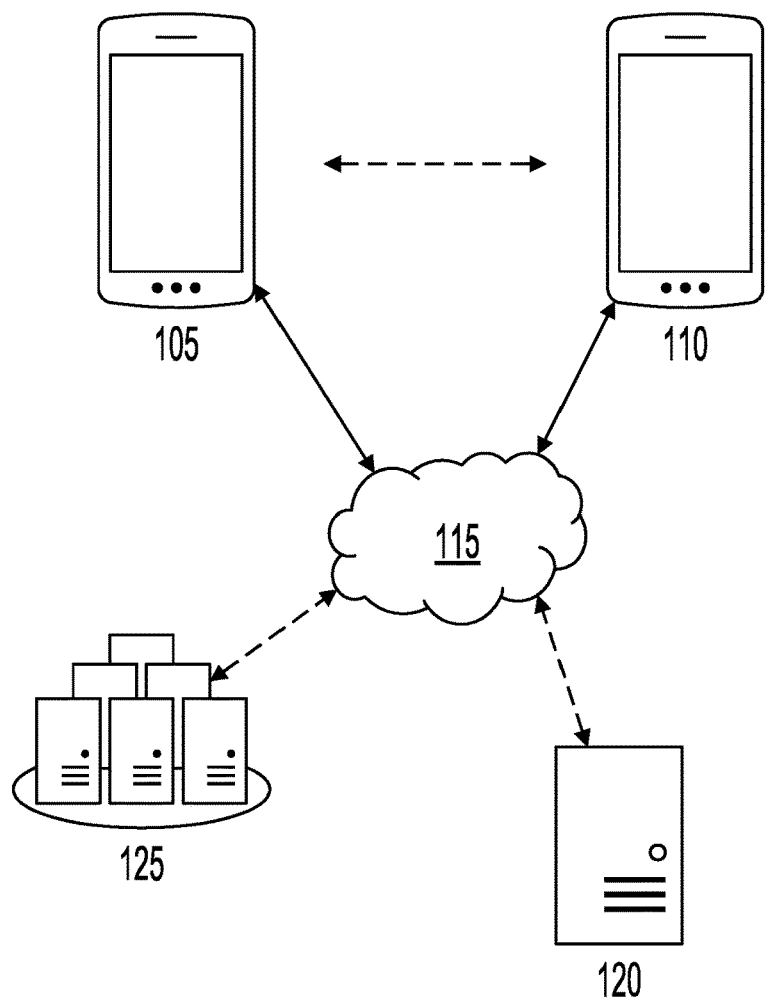
FIG. 1 illustrates an example system for in-person electronic signatures using mobile devices, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

Users want to ensure that electronic signatures can be performed quickly and securely on an as-needed basis. However, it is challenging to coordinate electronic signatures quickly without performing lengthy verification processes to ensure that the signatures are legitimate. Other approaches perform electronic signatures remotely, and may fail to ensure that the person performing the signature is who they say they are. Further, other approaches to electronic signing often require users to create profiles with the service providing the electronic signature functionality, which is a lengthy process that may be impractical to perform during in-person scenarios.

The techniques described herein enable mobile devices to perform electronic signatures without requiring a lengthy on-boarding process. To initiate signing of an electronic document, a first mobile device can execute an application that is used to select the electronic document for signature. The application then generates a code, which can be scanned by a second mobile device of a co-signor. The code can be unique to the electronic document, and can include an identifier of the first device. Using data obtained from the code, the second mobile device can transmit information to the first mobile device that indicates the second mobile device and the first mobile device are proximate. This may occur using a short-range communication protocol, such as Bluetooth, NFC, or using other network-based verification techniques as described herein. Upon verifying that the first and second mobile devices are proximate, the user of the second mobile device can provide input to sign the electronic document at the second mobile device. Metadata associated with the electronic signature can then be transmitted to the first mobile device. The first mobile device can then modify the electronic document to include the metadata, and optionally transmit the electronic document to the co-signor or a remote server.

FIG. 1 illustrates an example system for in-person electronic signatures using mobile devices, according to an embodiment. The system 100 may include a first computing device 105, a second computing device 110, a network 115, a server 120, and one or more third-party computing systems 125. Although the components of the system 100 are shown and may be referred to in the singular, it should be understood that any number of the components of the system 100 may be utilized to achieve desired results. One having ordinary skill in the art appreciates that the system 100 is not confined to the components described herein and may comprise additional or alternate components or may omit certain components. Furthermore, functionality attributed to a component of the system 100 may be fully or partially executed by other components of the system 100.

The first computing device 105 and the second computing device 110 may be any type of computing device capable of executing applications or processor-executable instructions. Non-limiting examples of the first computing device 105 and the second computing device 110 may be a smart phone, a tablet computer, a laptop computer, a desktop computer, or another type of computing device. The first computing device 105 and the second computing device 110 may execute an operating system, one or more native applications (e.g., electronic signature applications), web browser applications, or executable instructions retrieved from one or more data sources (e.g., the server 120 or one or more of the third-party computing systems 125) via the network 115. For example, first computing device 105 may execute a native or web-based application, and the second computing device 110 may execute a native, web-based, or another type of application retrieved via the network 115.

Each of the first computing device 105 and the second computing device 110 may include a respective display device, which may be a smart phone screen, a laptop screen a computer monitor, or any other type of suitable display device. The display device may present one or more user interfaces, such as the user interfaces described in connection with FIGS. 2A-2K. Each of the first computing device 105 and the second computing device 110 may include one or more input devices, such as a touchscreen, a mouse or trackpad, a keyboard, a keypad, or other types of input devices. Each of the first computing device 105 and the second computing device 110 may include a scanning device, such as a camera, QR code scanner, bar code scanner, or other types of devices that can scan codes generated using the techniques described herein. The scanner device can capture an image or data from various codes, which can be utilized by the processor or other computational elements of the first computing device 105 or the second computing device 110 to perform the techniques described herein. Each of the first computing device 105 and the second computing device 110 may include one or more output devices, including speakers, haptic devices, or other lights or alerts which may be used to provide output or data to users of the first computing device 105 or the second computing device 110.

Each of the first computing device 105 and the second computing device 110 may execute an operating system, which may provide one or more application programming interfaces (APIs) to invoke operating system functionality. Some examples of such functionality include launching applications using a URL or uniform resource identifier (URI) (e.g., a deep-link), causing the respective computing device to retrieve and execute processor-executable instructions based on a URL or URI, causing the computing device to transmit data to another computing device via a short-range wireless protocol (e.g., Bluetooth, near-field communication (NFC), etc.), via a wireless fidelity (Wi-Fi) network, or via a cellular data network, among any other functionality described herein. Such functionality may also be implemented by one or more native or web-based applications that may be executed by the first computing device 105 or the second computing device 110.

The first computing device 105 or the second computing device 110 can execute an electronic signature application, which may be a native or web-based application, and can be utilized to perform one or more of the techniques described herein. An overview of an example operation of the application is as follows. A user of the first computing device 105 can execute the application, and may be presented with one or more user interfaces (e.g., the user interfaces described in connection with FIGS. 2A-2K). At least one user interface can enable the user to select (e.g., via input at the first computing device 105) one or more electronic documents for which electronic signatures are needed. Upon selecting the electronic document(s) and initiating the electronic signature process (e.g., via user input at the first computing device 105), the application can generate a code. The code can be a QR code, a bar code, a text-based code, or any other type of code.

The code can include data relating to the electronic signature process for the electronic document, including an identifier of the electronic document, a device identifier of the first computing device 105, an identifier of the user initiating the electronic signature process, and a URL or URI that causes one or more operations to be performed by a computing device that scans or otherwise receives the code, among other information processor-executable instructions relating to the electronic signature process for the electronic document.

The computing device of the other intended signor of the electronic document(s) (e.g., the second computing device 110) can scan the code to retrieve the information encoded thereby. Additionally or alternatively, the first computing device 105 may transmit the code to the second computing device 110 using a suitable messaging protocol, such as a short message service (SMS) message, a multimedia messaging service (MMS) message, an internet-based instant message, electronic mail (e-mail), or using a wireless communication protocol. The code can include data (e.g., a deep-link, processor-executable instructions, etc.) that causes the second computing device 110 to launch the electronic signature application. Alternatively, the code can include data (e.g., a deep-link, processor-executable instructions, etc.) that cause the second computing device 110 to retrieve and execute a second application, which may perform one or more of the operations relating to the electronic signature process as described herein.

Once the code has been scanned or received, the second computing device 110 can use the data in the code to communicate with the first computing device 105, for example, via a wireless communication protocol such as Wi-Fi, Bluetooth, or NFC. The second computing device 110 (or any applications or code executing thereon) can present a user interface that enables the user of the second computing device 110 to input a signature. The signature may be drawn, for example, using a touch screen, or may be indicated via an interaction with a button, link, or other interactive user interface element. Upon indicating that the user has electronically signed the document, the second computing device 110 can generate and transmit metadata to the first computing device 105, which may include location identifying data of the second computing device 110 (e.g., geolocation data, identifiers of one or more proximate wireless networks, etc.), a timestamp of the electronic signature, an identifier of the user of the second computing device 110, or any other information relating to the electronic signature.

Upon receiving the metadata from the second computing device 110, the first computing device 105 can modify the electronic document to include all or a subset of the metadata, for example, to indicate that the electronic document has been signed by the user of the second computing device 110. Additionally or alternatively, the first computing device 105 (or the second computing device 110) may generate a digital fingerprint (e.g., a hash value, etc.) of the metadata using a suitable data fingerprinting algorithm. Modifying the electronic document can include modifying the appearance of the electronic document, for example, to indicate that the document has been electronically signed. Modifying the electronic document may also include embedding information (e.g., the metadata or digital fingerprint, etc.) in a header or region of memory in the electronic document does not necessarily affect the appearance of the electronic document. The first computing device 105 can then provide the signed electronic document to the second computing device 110, or transmit the signed electronic document to the server 120 or one or more of the third-party computing systems 125 via the network 115.

The network 115 may be any type of communication medium such as a local area network (LAN), metropolitan area network (MAN), or a wide area network (WAN). For instance, the network 115 may be the internet, an intranet, a satellite network, or a cellular communication network. The network 115 may be a combination of various wired and wireless links capable of carrying data packets between the various computing systems or devices described herein. For example, the network 115 may include wireless cellular networks, which may be accessed by smartphones or cellular-enabled mobile devices, including tablets or laptop computers. The network 115 may also include any number of computing devices (e.g., computers, servers, routers, network switches, etc.) that are configured to receive or transmit data within the network 115 and to other computing systems or devices in communication with the network 115.

The network 115 may further include any number of hardwired and/or wireless connections. Any or all of the computing devices described herein (e.g., the first computing device 105, the second computing device 110, the server 120, the one or more third-party computing systems 125, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 115. Any or all of the computing devices described herein may also communicate wirelessly with the computing devices of the network 115 via a proxy device (e.g., a router, network switch, or gateway).

The system 100 may optionally include a server 120, which may communicate with the first computing device 105, the second computing device 110, or the one or more third-party computing systems 125 via the network 115. The server 120 may be any computing device comprising non-transitory machine-readable storage media and a processor capable of executing the various processes and tasks described herein. Non-limiting examples of a server 120 may include a server computer, a computing device in a datacenter, a desktop, a laptop, a tablet, or the like. In some cases, the server 120 may be coupled to one or more databases or other external memory devices, which may be used to store any of the information accessed by the server 120. The server 120 can include a data repository, which may be a database or another type of memory structure that is capable of storing information relating to the electronic documents, electronic signatures, or devices performing electronic signatures, as described herein. The first computing device 105 or the second computing device 110 may retrieve or provide data relating to profiles, signatures, device identifiers, or metadata corresponding to electronic signatures for storage in the data repository of the server 120. The server 120 may store these values in association with a unique identifier for each electronic signature, electronic document, or device identifier, so as to provide a record of electronic signatures (and any metadata associated therewith) for signature verification or retrieval.

The server 120 may host one or more web-based applications, including applications that the computing devices (e.g., the first computing device 105 or the second computing device 110) may utilize to perform the various operations described herein. For example, the server 120 may comprise a webserver allowing the various computing devices to access data that is collected and manipulated by the server 120. Furthering the above example, a user of the first computing device 105 may execute a web browser application and access a website hosted on the webserver in order to access the web-based application that can cause the first computing device 105 to perform the operations described herein.

The server 120 may also maintain and provide one or more electronic documents to the first computing device 105 or the second computing device 110 in response to a corresponding request. For example, the electronic documents may be template electronic documents that are unsigned (e.g., templates of contracts such as non-disclosure agreements (NDAs) or other common agreements, templates of other electronic documents having signature fields, etc.). The server 120 may also retrieve one or more documents from one or more third-party sources, such as the third-party computing systems 125. The electronic documents may be retrieved by the server 120 in response to a request by a user (e.g., via the first computing device 105 or the second computing device 110).

The server 120 may maintain one or more profiles corresponding to different users. Using a computing device (e.g., the first computing device 105 or the second computing device 110), users may view, create, delete, or modify their profiles. Modification of profiles can be performed via one or more user interfaces, such as the user interfaces described in connection with FIGS. 2A-2K. In one embodiment, a user must have a profile at the server 120 in order to initiate the electronic signature process described herein. Alternatively, the user may perform the electronic signature process without first creating a profile and the profile may be created at a later time and subsequently associated with the previously performed electronic signature(s). A profile may include any information relevant to the user or the electronic signature process described herein, including the name of the user, an e-mail address of the user, a business website associated with the user, one or more device identifiers of devices operated by the user, identifiers of other accounts or profiles maintained by one or more of the third-party computing systems 125, among other information.

To provide its various functionality, the server 120 may provide one or more network-based APIs, which may be invoked by applications executing on one or more of the first computing device 105 or the second computing device 110, as described herein. For example, the user may utilize one or more of the APIs provided by the server 120 to retrieve an electronic document, or to create, modify, or view their profile or a profile of a co-signer. The APIs of the server 120 can be invoked using corresponding requests that may be transmitted by the respective computing device invoking the APIs. The requests may include additional information relating to the respective request, such as an identifier of an electronic document in a request to retrieve an electronic document, for example.

Although certain techniques described herein are framed such that the first computing device 105 performs or coordinates the electronic signature process, it should be understood that the electronic signature process may also be coordinated by other computing devices, such as the server 120. For example, in some embodiments, the server 120 may receive a request to initiate signatures for an electronic document from a mobile computing device (e.g., the first computing device 105). In response to the request, the server can transmit a list of one or more electronic documents that are available to the first computing device 105. User input at the first computing device 105 can select an electronic document for the electronic signature process. The selection can be provided to the server 120, which can then generate a code corresponding to the electronic document, as described herein.

The code can be provided to the first computing device 105, which can present the code to the mobile device of the co-signor (e.g., the second computing device 110). The second computing device 110 can then transmit a message to the server 120, which may include information in the code, to indicate that the code has been scanned by the second computing device 110. The server 120 can then determine whether the first computing device 105 and the second computing device 110 are in close proximity. For example, the server 120 may compare the IP addresses of the two devices to determine that they are connected to the same local wireless network. The server 120 may request or receive geolocation data (e.g., data captured from one or more GPS sensors) from the first computing device 105 and the second computing device 110. The geolocation data of the two devices can be compared to determine if the devices are in close proximity.

If the devices are determine to be in close proximity, the server 120 can provide a corresponding user interface to the second computing device 110 (e.g., by communicating with an application executing on the second computing device 110, by providing a web-page or web components to a browser executing on the second computing device 110, etc.) that enables the co-signor to perform a sign action. The sign action may include drawing an electronic signature, selecting an electronic signature, or interacting with a button that indicates the co-signor has signed the electronic document. Once the co-signor performs the signature action, the second computing device 110 can generate and transmit metadata to the server 120, as described herein. The server 120 can then modify the electronic document to include the metadata or a digital fingerprint of the metadata, and can provide the signed electronic document to the first computing device 105 and the second computing device 110.

The system 100 may optionally include one or more third-party computing system(s) 125, which may be computing systems operated by one or more third-parties that maintain electronic documents, provide messaging services (e.g., e-mail servers, electronic messaging servers, etc.), or other electronic services that may be related to the electronic signature functionality described herein. The third-party computing system(s) 125 may include one or more servers or computing devices that operate a third-party electronic document repository. The electronic document repository may include a library of template electronic documents that are verified by the third-party corresponding to the electronic document repository. The electronic documents from the library may be accessed or retrieved by the server 120, the first computing device 105, or the second computing device 110.

The third-party computing system(s) 125 may include one or more servers or computing devices that operate a third-party e-mail or electronic messaging service, which may be utilized to transmit or receive signed electronic documents, as described herein. The electronic messaging service may include one or more e-mail servers, via which the first computing device 105 or the second computing device 110 can transmit e-mails including the signed electronic documents. Additionally or alternatively, the e-mail servers may also be utilized to share one or more unsigned electronic documents (e.g., for inspection prior to the electronic signature process). The third-party computing system(s) 125 may include electronic messaging servers or systems, which may similarly be utilized to transmit signed or unsigned electronic documents as described herein. The functionality of the third-party computing system(s) 125 may be invoked via one or more APIs by the server 120, the first computing device 105, or the second computing device 110.

Figure 2A:
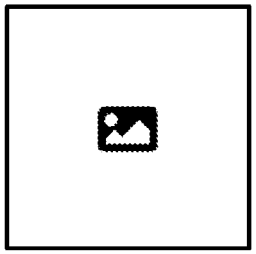

Referring to FIGS. 2A, 2B, 2C, 2D, 2E, 2F, 2G, 211, 21, 2J, and 2K, illustrated are example graphical user interfaces of applications that may be utilized to perform one or more of the electronic signature operations described herein, according to an embodiment. FIG. 2A shows an example user interface 200A, which may be displayed by a mobile computing device (e.g., the first computing device 105) via an application. As shown, the user interface 200A provides fields in which the user can provide their login credentials to access the functionality of the application (e.g., the electronic signature functionality described herein). The login credentials may be verified by a remote server (e.g., the server 120). After successfully signing in, the application may navigate to a home screen, which may include details relating to the profile associated with the login credentials (e.g., signed electronic documents, unsigned electronic documents, profile information, etc.). As shown, interactive links enable the user to view the privacy policy associated with the application (e.g., the link labeled "Privacy"), as well as perform a registration process (e.g., the link labeled "Register Here") or to recover their login credentials (e.g., the link labeled "Forgot password?").

Figure 2B:
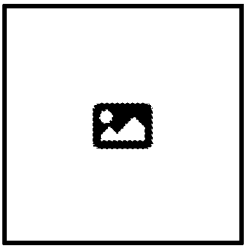

If the user interacts with the "Register Here" interactive link, a user interface similar to that shown in FIG. 2A may be displayed. FIG. 2B shows a user interface 200B that includes fields in which the user can provide credentials to create a profile at the remote server. As shown, the fields include an email address field, a password field, and a password confirmation field. Although not shown here, it should be understood that additional or alternative fields may be utilized to collect additional or alternative user information to create a profile at the remote server. Upon entering in appropriate details and interacting with the "Submit" button, the mobile computing device can transmit a request to create a corresponding profile for the user to the remote server. The request can include the information entered in the fields of the user interface 200B. If the user interacts with the "Sign In Here" button, the application can navigate to and display the user interface 200A of FIG. 2A.

Figure 2C:
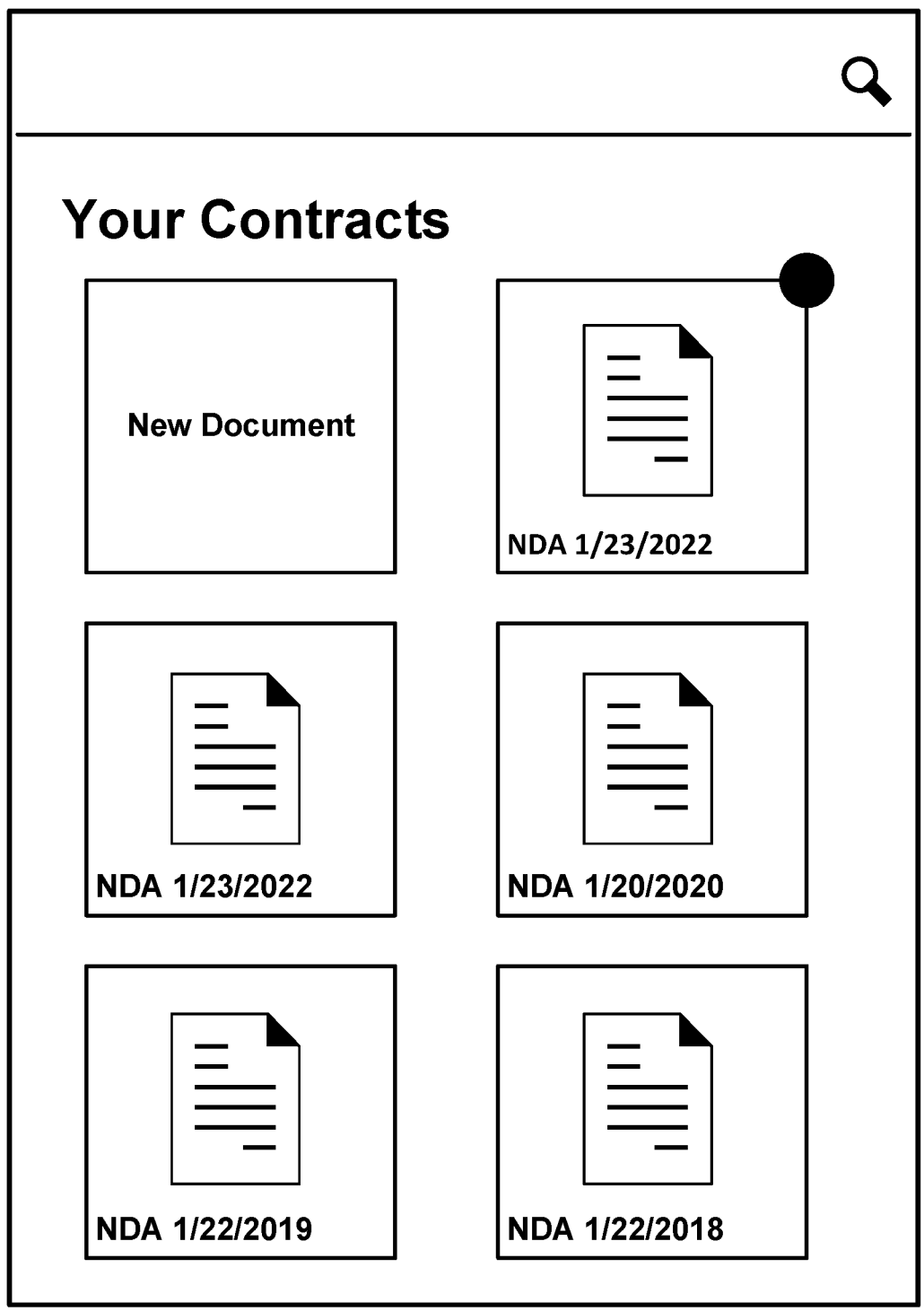

Once the user has entered in valid credentials, and the mobile device has received corresponding profile information for the user from the remote server, the application can display the home screen interface as shown in FIG. 2C. FIG. 2C shows an example user interface 200C, which lists each of the signed or unsigned electronic documents associated with the profile as interactive buttons. In an embodiment, the contents of the electronic document may be partially displayed on its corresponding button. The user interface 200C can include a field that enables a user to search for one or more documents (e.g., by querying the remote server) associated with the profile. The user interface 200C includes a "New Document" button, which when interacted with, causes the application to initiate the electronic signing processes described herein.

When the user interacts with a button corresponding to an electronic document, the application can navigate to an "inspect document" interface for that electronic document, such as the interface shown in FIG. 2D. FIG. 2D shows an example user interface 200D, which depicts the details of an electronic document. The user interface 200D can include a view of a portion of the signed or unsigned electronic document. The view of the document can be scrollable and can be magnified according to various user input, such that the application can present the entirety of the electronic document to the user in a readable format. The user interface 200D can include a name of the electronic document, a date or time of creation or signature of the electronic document, as well as interactive links that can be used to view or modify the electronic document.

When interacted with, the link labeled "Expand" can cause the electronic document to be displayed in a full-screen mode, such that it may be more easily viewed by the user. When interacted with, the link labeled "Share" can invoke one or more operating system APIs or other user interfaces that enable the user to share the electronic document (e.g., signed or unsigned) via an e-mail, electronic message, or by transmitting the electronic document to the remote server (e.g., the server 120) or a third-party computing system (e.g., the third-party computing system(s) 125). When interacted with, the link labeled "Change Name" can present a field that enables the user to enter in a new name for the electronic document. When interacted with, the link labeled "View Co-Signer(s)" can provide an interface that lists or displays profile(s) for one or more co-signers of the electronic document, if any. When interacted with, the link labeled "eSign Document" can enable the user of the computing device to provide an input to electronically sign the document, as described herein. When interacted with, the link labeled "Back to Home" can cause the application to navigate to the user interface 200C of FIG. 2C.

Figure 2E:

FIG. 2E shows an example user interface 200E that presents profile information for a co-signer of the electronic document shown in FIG. 2D. Alternatively, if the co-signer does not have a profile at the remote server, information relating to the co-signer stored in the metadata of the electronic document may be displayed. The information for the co-signer may include a name, an e-mail address, a phone number, an address, a title, a job industry, a company, and a website, among others. The user interface 200E can include one or more interactive user interface elements that cause the application to e-mail the co-signer, call the co-signer, or navigate to the website of the co-signer. The user interface 200E may also include one or more buttons to navigate to various social media pages associated with the co-signer. The user interface 200F includes a link labeled "Back," which when interacted with, causes the application to navigate to the user interface 200E of FIG. 2E.

Figure 2F:

FIG. 2F shows an example user interface 200F that enables a user to edit their profile by providing data via one or more fields. For example, the user interface 200F includes a field for a different e-mail address, a field for a different phone number, and a field for a website, among others. The user interface 200F may include buttons that enable the user to access additional electronic signature functionality (e.g., upgrade their plan) at the remote server. The user interface 200F may include a profile picture, which may be modified by selecting the pencil icon at the bottom right of the profile picture. The user interface 200F includes a link labeled "Back," which when interacted with, causes the application to navigate to the user interface 200C of FIG. 2C.

Figure 2G:
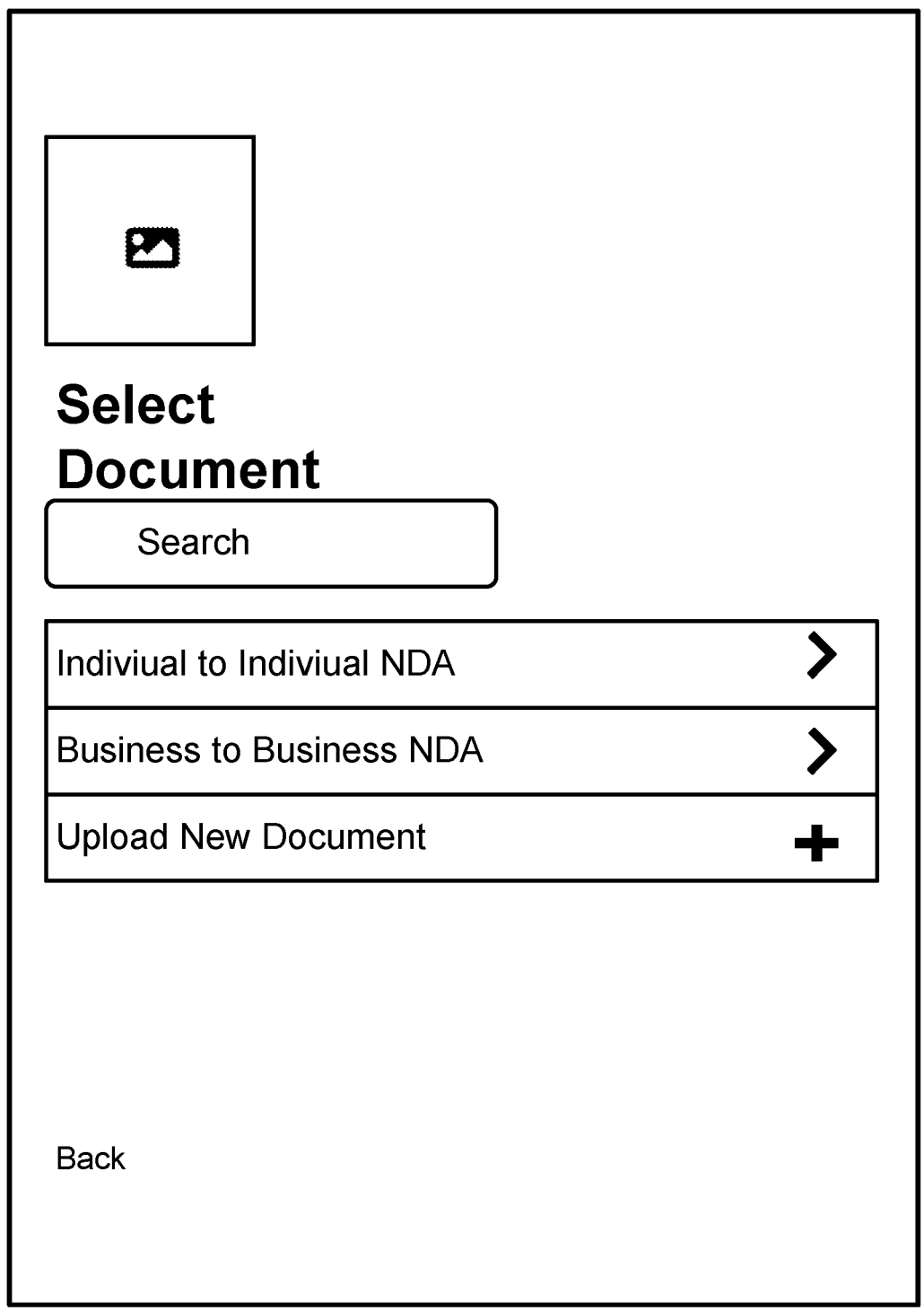
Figure 2H:
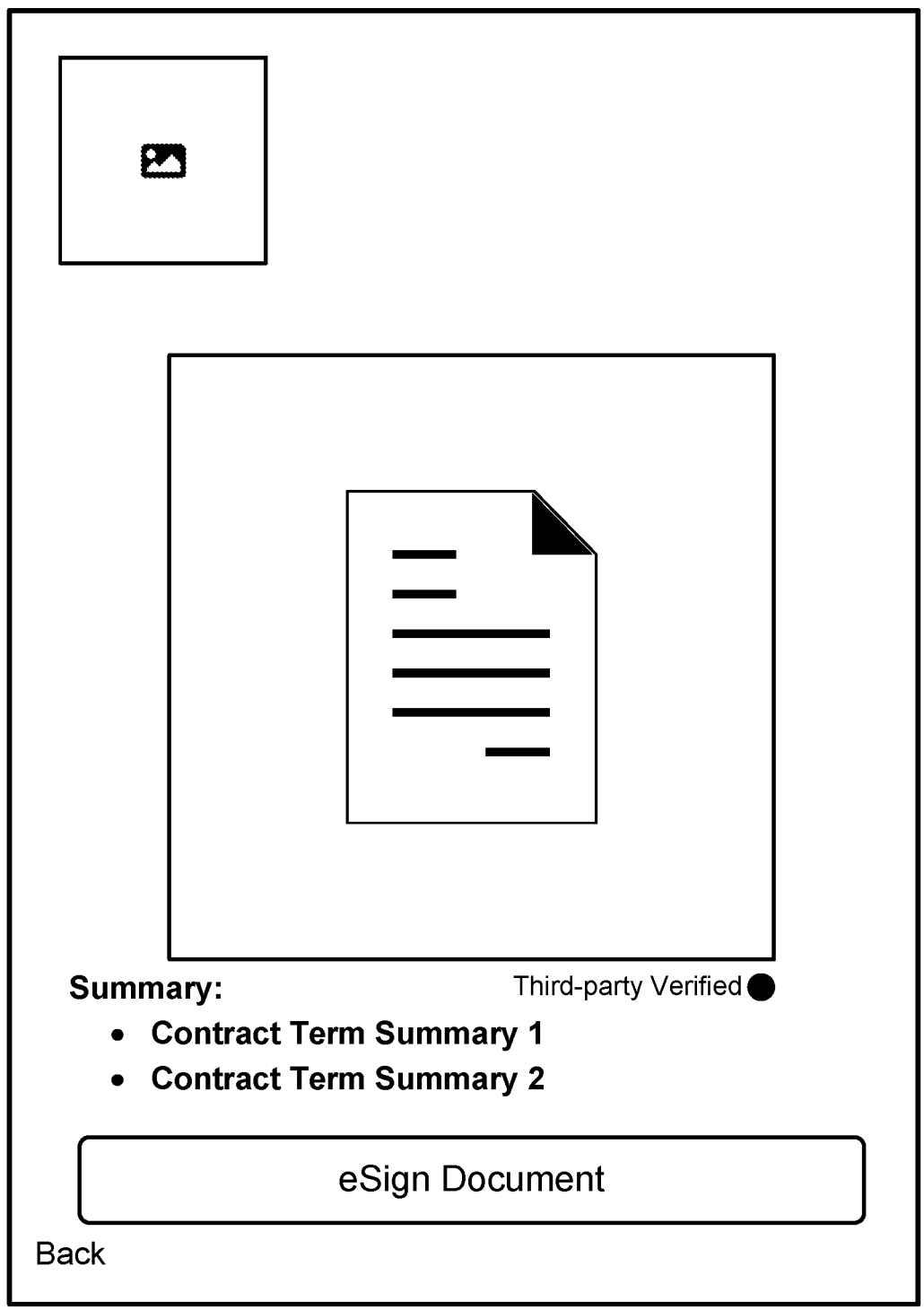

FIG. 2G shows an example user interface 200G that may be displayed upon selecting the "New Document" button shown in the user interface 200C of FIG. 2C. The user interface 200G can list one or more electronic documents that are available for creation or selection by the user. Each of the available electronic documents may be associated with the profile of the user by the remote server. The user interface 200G includes a button to upload or otherwise select a new electronic document. The new electronic document may be stored locally, may be available at (and retrieved from, in response to a request) a third-party computing system, or may be captured using a camera or other scanning device of the mobile computing device executing the application. The user interface 200G may include a search field, which can enable a user to search for available electronic document templates. The user interface 200G includes a link labeled "Back," which can cause the application to display the user interface 200C of FIG. 2C.

Upon selecting the document, a summary page that enables the user to sign the electronic document is presented, such as the interface shown in FIG. 2I1. FIG. 2I1 shows an example user interface 200I1 that includes the summary of the document. The user interface 200I1 includes a view of the selected document. As in the user interface 200D of FIG. 2D, the view of the document can be scrollable and can be magnified according to various user input, such that the application can present the entirety of the electronic document to the user in a readable format. If the document has previously been verified by a third-party, the user interface 200I1 can indicate as such below the view of the document, as shown. The user interface 200I1 can include a summary of the electronic document (e.g., a summary of contract terms, a summary of other information in the electronic document, an identifier of the electronic document, etc.). The summary may be displayed by bullet-points, and may be searchable, scrollable, or magnified according to user input. The user interface 200I1 includes a button that, when interacted with, causes the application to modify the electronic document with metadata corresponding to the user. The modification can include embedding location data, device data, profile data, a timestamp of the electronic signature, a hash or digital signature of the foregoing data, or any other information that indicates that the document has been electronically signed. The user interface 200I1 includes a link labeled "Back," which can cause the application to display the user interface 200G of FIG. 2G.

After the electronic document has been signed by the user, the application can present an interface that shows a code that is generated using the techniques described herein, as shown in FIG. 2I. FIG. 2I shows an example user interface 200I that shows the code and a prompt stating "Touch Phones to Finalize Signatures." The user interface 200I may also include a field that enables the user to send the code via email to the desired co-signer. The co-signer can use their mobile computing device to scan the code. The code can cause the mobile device of the co-signer to execute (or retrieve and execute) an application that connects to the mobile device of the user providing the code, and transmits metadata indicating the signature of the co-signer, as described herein. The user interface 200I includes a link labeled "Back," which can cause the application to display the user interface 200I1 of FIG. 2I1.

Figure 2J:
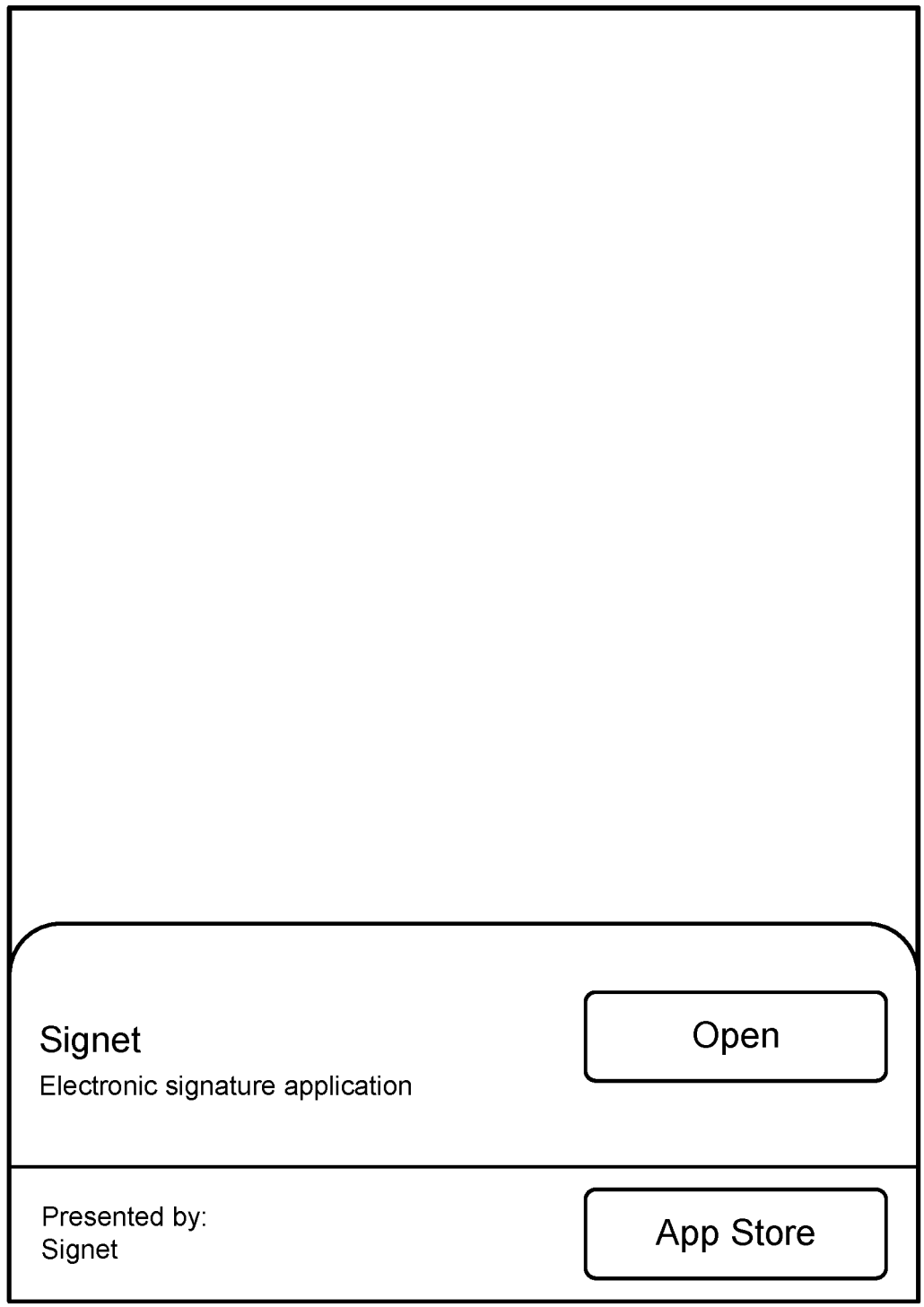

FIG. 2J shows an example user interface 200J that shows an example prompt on the mobile device of a co-signor (e.g., the second computing device 110), in response to scanning the code shown in FIG. 2I. In one embodiment, the code can invoke an operating system API that causes the mobile device of the co-signor to present a pop-up interface (which may be an overlay interface) that prompts the co-signor to retrieve processor-executable instructions to perform the electronic signature or to access an application store from which the electronic signature application can be downloaded. As shown, the pop-up interface includes an "Open" button, which when interacted with, causes the mobile device of the co-signor to retrieve processor-executable instructions from a remote source (e.g., a third-party computing system 125), and execute the instructions. Doing so may cause the mobile device of the co-signor to present a user interface similar to that shown in FIG. 2K. The pop-up interface also includes an "App Store" button, which when interacted with can cause the mobile device of the co-signor to launch an application store (e.g., which may be installed as part of the operating system of the device). The application store can automatically be navigated to the electronic signature application, such that it may be conveniently downloaded by the co-signor in response to an interaction.

Figure 2K:

FIG. 2K shows an example user interface 200K, which may be presented by the mobile device of the co-signor (e.g., the second computing system 110) in response to an interaction with a button shown in FIG. 2J. The user interface 200K may include a button (here, the button labeled "Sign") that enables the co-signer to perform a signing action (e.g., via an interaction). Additionally, although not shown here, the user interface 200K may include details relating to the electronic signing process, including an identifier of the electronic document, an identifier of other signor, a device identifier of the device that initiated the electronic signing process (e.g., the first computing device 105), among other information. Interacting with the "Sign" button can cause the mobile device of the co-signor to generate metadata indicating the electronic signature, as described herein.

Figure 3:
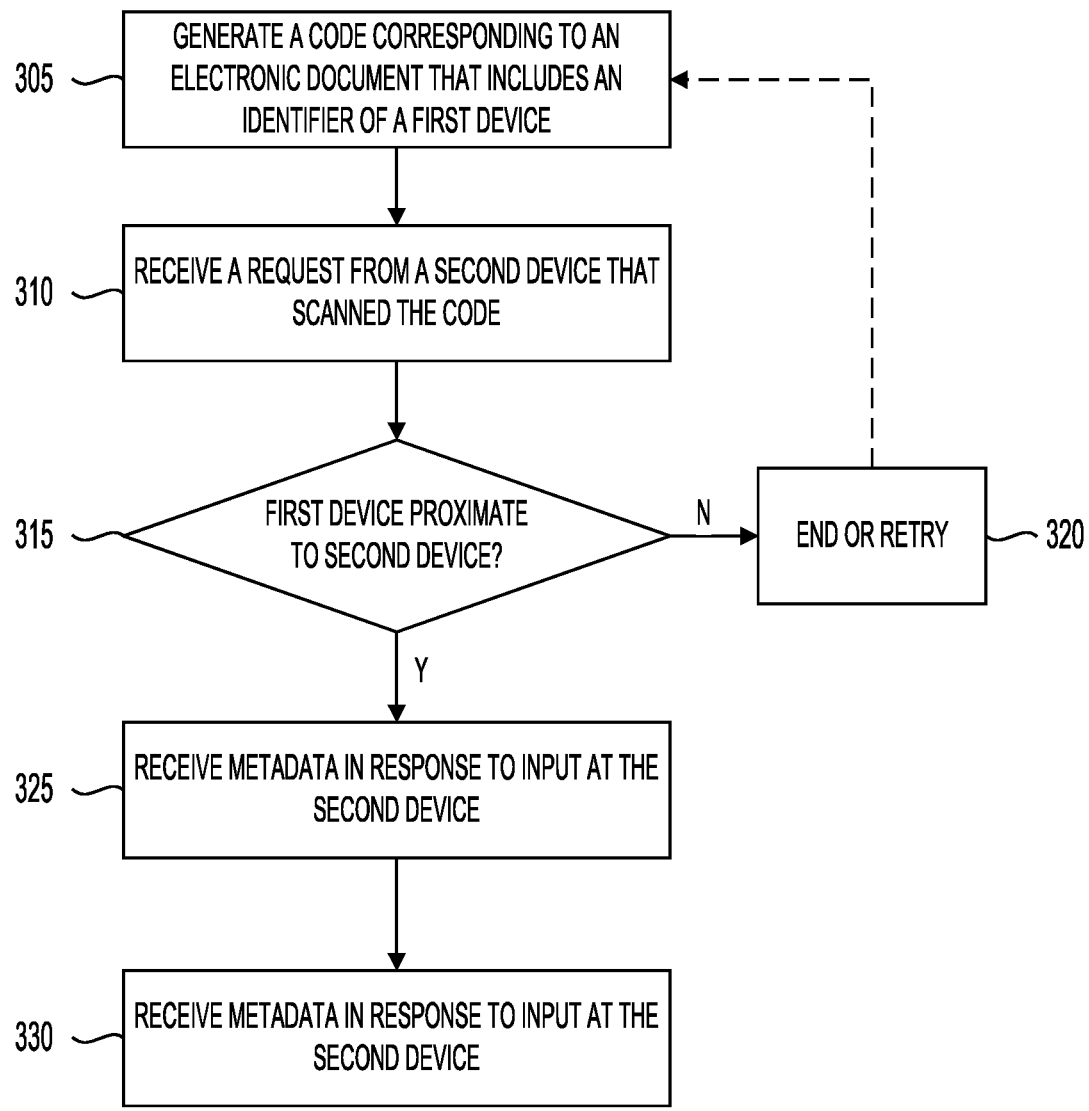
FIG. 3 illustrates a flow diagram of an example method for performing electronic signatures using mobile devices, according to an embodiment.

FIG. 3 illustrates a flow of a method 300 executed in a system (e.g., the system 100, other computing systems described herein, etc.) for performing electronic signatures using mobile devices, in accordance with an embodiment. The method 300 includes steps 305-330. However, other embodiments may execute steps in an alternative order, may include additional or alternative steps, or may omit one or more steps altogether. The method 300 is described as being executed by a first device, such as the first computing device 105 of FIG. 1, but it should be understood that any computing device described herein may perform the operations of the method 300.

Step 305 of the method 300 can include generating a code corresponding to an electronic document (e.g., one or more electronic document(s) selected using a user interface, such as the user interface 200G of FIG. 2G). The electronic documents may be selected from local memory of the first device, retrieved from a server (e.g., the server 120), or retrieved from a third-party computing system (e.g., the third-party computing system 125). The code can include a device identifier associated with the first device. The device identifier can be any type of identifier of the device, including a GUID, a ULM, a device name, a device pairing parameter, a device IP address or network location, or the like. The code may also include an identifier of the electronic document. In an embodiment, the code can be a URL or a URI that includes the foregoing information.

In some embodiments, the code may be associated with an expiration timer, after which any electronic signatures attempting to use the information in the code are considered invalid. The code can be encoded into a visual format, such as a QR code or a bar code. Upon generating the code, the first device can present the code on a display of the first device (e.g., a smartphone touchscreen display, etc.), such that it may be scanned by a second device of a co-signor. Additionally or alternatively, the code may be transmitted to the second device via an electronic message (e.g., an e-mail, an SMS message, MMS message), or to a third-party computing system (e.g., the third-party computing system 125) that is accessible by the second device. In some embodiments, for example when multiple documents are signed, a session code (similar to the codes corresponding to documents, as described herein) can be generated for an electronic signature session. The session code can include, for example, any of the identifiers of documents that are to be signed during the electronic signature session, or any information described in connection with codes that correspond to documents. The session code can be transmitted with one or more document codes. In an embodiment, a session code can be utilized to in lieu of several codes for electronic signatures of multiple documents.

In one embodiment, the code can include a URL or a URI that includes a deep-link that causes the second device to perform one or more operations. For example, the URL or URI can be or include a deep-link that, upon scanning, causes the second device to launch an application corresponding to the electronic signature process. If the application is not installed on the second device, the deep-link may cause the second device to present a prompt to install said application. In another embodiment, the code can include a deep-link that causes the second device to retrieve and execute processor-executable instructions from a location indicated in the URL or URI. The application (or retrieved processor-executable instructions) can cause the second device to perform additional operations as described herein.

In an embodiment, while presenting the code, the first device can broadcast its availability to connect via a wireless communication protocol (e.g., as Bluetooth central, listening on one or more transmission control protocol (TCP) ports or user datagram ports (UDP) ports, etc.). In another embodiment, the electronic document is displayed to the co-signer on the first device in addition to the code, such that it may be inspected by the co-signor. Additionally or alternatively, the electronic document may be transmitted to the second device of the co-signor via an electronic message (e.g., e-mail, SMS, MIMS, etc.).

Step 310 of the method 300 can include receiving a request from a second device (e.g., the second computing device 110) that scanned the code. Upon scanning the code, the second device can execute an application or retrieved processor-executable instructions (referred to from now on as the "application"), as described herein. The application executing on the second device can cause the second device to present a user interface to the co-signor at the second device. The user interface may include an identifier of the electronic document, an identifier of the user that initiated the signing process, device information of the first device, or any other information that may have been included in the code. In addition, the application can cause the second device to transmit a connection request to the first device. The connection request may be a Bluetooth connection request (e.g., by broadcasting as a peripheral), which may include or utilize a pairing parameter, device identifier, or other device information of the first device to transmit the request. Alternative requests may also be possible, such as a request transmitted via local Wi-Fi (e.g., peer-to-peer Wi-Fi, via a common Wi-Fi access point, etc.) or a request transmitted via NFC. As the code is being displayed at the first device, the application executing on the first device can monitor for incoming requests from the second device. Upon receiving the request, the first device can proceed to execute step 315 of the method 300.

Step 315 of the method 300 can include determining, using network information, whether a proximity of the first device to the second device satisfies a threshold. After receiving the request, the first device can determine whether the second device is proximate to the first device. In one embodiment, upon receiving a Bluetooth connection request, the first device can attempt to pair with the second device (e.g., by connecting and subscribing to the second device as central). If the Bluetooth pairing process is successful, then the first device can determine that the second device is proximate to the first device, and execute step 325 of the method 300. Otherwise, the first device can execute step 320 of the method 300.

In another embodiment, the first device can receive a request via Wi-Fi or a cellular wireless connection that includes an IP address of the second device. Using the IP address of the second device, the first device can determine whether the first device and the second device are connected to the same local wireless network, or if the two devices can establish a peer-to-peer Wi-Fi connection. If the two devices are connected to the same local wireless network, or if the two devices can establish a peer-to-peer Wi-Fi connection, the first device can proceed to execute step 325 of the method 300. Otherwise, the first device can execute step 320 of the method 300. In another embodiment, the first device can attempt to exchange information via NFC with the second device (e.g., a handshake). If the information exchange is successful, the first device can proceed to execute step 325 of the method 300. Otherwise, the first device can execute step 320 of the method 300.

Step 320 of the method 300 can include retrying the proximity test between the first and second devices, or ending execution of the method 300. If connecting to the second device was unsuccessful, or if the first device can otherwise not determine that the second device is proximate to the first device, the first device may retry the connection process by returning to and executing step 315 of the method 300. This process may be repeated a predetermined number of times, or for a predetermined amount of time (e.g., five re-connection attempts, or the second device must connect or communicate within 60 seconds, etc.). If the first device still cannot determine that the second device is proximate to the first device, the application executing on the first device may present a user interface indicating that the electronic signature process failed. The user interface may include a prompt for the user to re-sign their document and re-initiate the process at step 305 of the method 300. Alternatively, the first device may not attempt to retry the connection, and the user may be prompted that the electronic signature failed.

Step 325 of the method 300 can include receiving metadata received in response to input at the second device. As described herein, upon scanning the code, the second device can prompt the co-signor to sign the electronic document. The prompt can include a user interface that displays an identifier of the electronic document, an identifier of the user that initiated the signing process, device information of the first device, or any other information that may have been included in the code. The user interface can include a button, which when interacted with, causes the second device to generate metadata indicating an electronic signature for the electronic document.

Additionally or alternatively, the user interface can include one or more fields via which the co-signor can draw or type (e.g., via touch input, mouse input, keyboard input, etc.) their electronic signature. The metadata comprises one or more of a location of the second device, an identifier of the second device, a timestamp of the input at the second device, and the drawn or typed electronic signature of the co-signor, if provided. Upon generating the metadata, the second device can transmit the metadata to the first device via Bluetooth (e.g., if paired), Wi-Fi, a cellular data network, or an electronic message (e.g., e-mail, SMS, etc.). The first device can receive the metadata and store it locally in the memory of the first device.

Step 330 of the method 300 can include modifying the electronic document based on the metadata. Upon receiving the metadata from the second device, the first device can include the metadata in the electronic document, for example, by modifying the electronic document. Modifying the electronic document can include, for example, inserting a drawn or typed electronic signature of the co-signor in the document at one or more predetermined locations, embedding all or a portion of the metadata in a header or other location of the document that does not necessarily affect the appearance of the electronic document, as well as populating one or more fields of the electronic document with the metadata (e.g., date or time signed, the names of the user or the co-signor, etc.). In embodiment, the first device can generate a digital fingerprint based on the metadata. For example, the first device may execute a hashing algorithm to generate a hash of the metadata generated by and received from the second device. The digital fingerprint can be inserted or embedded into the document (e.g., visually, such that it appears in one or more predetermined locations on the electronic document, or non-visually).

In an embodiment, the user of the first device may be prompted to perform a countersign action in a user interface of the application. For example, the user may be prompted to provide a countersignature for the electronic document, using techniques similar to those described herein. Metadata corresponding to the countersignature can be generated, and the electronic document can be modified to include the countersignature using techniques similar to those described herein. After the first device has modified the electronic document, the first device can transmit the electronic document to a remote server (e.g., the server 120). The server can then store the electronic document in association with a profile of the user, as well as a profile of the co-signor, if the co-signor has a profile at the server. The first device or the server may then transmit the signed electronic document to the second device via an electronic message (e.g., email, SMS, MMS, etc.). Additionally, if the co-signor has a profile at the server, the second device can execute the application described to view the signed document on their home screen, as described in connection with FIGS. 2C and 2D. In an embodiment, the server or the first device may generate a non-fungible token (NFT) corresponding to the signed electronic document, the signature of the user, or the signature of the co-signor.

In a non-limiting example, the techniques described herein may be utilized to perform in-person electronic signatures in a secure manner using mobile devices. A first user may approach another user in person, and they may want to electronically sign a contract, such as a non-disclosure agreement (NDA), before discussing business matters. To do so, the first user can execute an application that allows the user to select the NDA and generate a code that the second user can scan using their mobile device. Upon scanning, the mobile device presents a pop-up with a button to the second user, who can interact the button to provide their electronic signature. The techniques described herein allow for electronic signatures in person, and the metadata recorded in the electronic document can indicate the presence and proximity of each user that provided a signature.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The operations described in this specification can be implemented as operations performed by a data processing apparatus on data stored on one or more computer-readable storage devices or received from other sources.

The terms "data processing apparatus", "data processing system", "client device", "computing platform", "computing device", "computing system", "user device", or "device" can encompass all kinds of apparatus, devices, and machines for processing data, including by way of example a programmable processor, a computer, a system on a chip, or multiple ones, or combinations, of the foregoing. The apparatus can include special purpose logic circuitry, e.g., a field-programmable gate array (FPGA) or an application-specific integrated circuit (ASIC). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, a digital camera device, a video camera device, or a portable storage device (e.g., a universal serial bus (USB) flash drive), for example. The processor and the memory can be supplemented by, or incorporated in, special purpose logic circuitry.

To provide for interaction with a user, implementations of the subject matter described in this specification can be implemented on a computer having a display device, e.g., a liquid crystal display (LCD), a light-emitting diode (LED) display, an organic light-emitting diode (OLED) display, a cathode ray tube (CRT), plasma, among others, for displaying information to the user; a keyboard; and a pointing device, e.g., a mouse, a trackball, or a touchscreen, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the computing devices described herein can each be a single module, a logic device having one or more processing modules, one or more servers, or an embedded computing device.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:
generating, a first device comprising one or more processors coupled to a non-transitory memory, a code corresponding to an electronic document, the code comprising a device identifier associated with the first device;
displaying, by the first device, the code on a display associated with the first device;
receiving, by the one or more processors, a request from a second device that scanned the code via a connection established by the second device using the information included in the code; and
in response to determining, by the one or more processors, using network information of the established connection, that a proximity of the first device to the second device satisfies a threshold:
receiving, by the one or more processors via a peer to peer connection with the second device, metadata received in response to user input at the second device; and
modifying, by the one or more processors, the electronic document based on the metadata.

2. The method of claim 1, wherein the code further comprises an identifier of the electronic document.

3. The method of claim 1, wherein the code is a quick-response (QR) code, and the method further comprises presenting, by the one or more processors, the QR code at a display device.

4. The method of claim 1, wherein determining the proximity of the first device to the second device is based on detecting, by the one or more processors, the second device using a wireless communication protocol or is based on an internet protocol (IP) address of the second device.

5. The method of claim 1, further comprising transmitting, by the first device, the code in an electronic message.

6. The method of claim 1, further comprising transmitting, by the first device, the electronic document to a remote server responsive to modifying the electronic document.

7. The method of claim 1, wherein the code comprises a uniform resource locator (URL) that causes the second device to retrieve and execute an application that transmits a connection request to the first device.

8. The method of claim 1, wherein the metadata comprises one or more of a location of the second device, an identifier of the second device, and a timestamp of the input at the second device.

9. The method of claim 1, wherein modifying the electronic document comprises:
generating, by the one or more processors, a digital fingerprint based on the metadata; and
embedding, by the one or more processors, the digital fingerprint in the electronic document.

10. The method of claim 1, further comprising:
transmitting, by the first device, the metadata to a remote server, whereby the remote server validates an authenticity of the metadata.

11. A system, comprising:
a non-transitory memory comprising a set of instructions that when executed, cause one or more processors of a first device to:
generate a code corresponding to an electronic document, the code comprising a device identifier associated with the first device;
display the code on a display associated with the first device;
receive a request from a second device that scanned the code via a connection established by the second device using the information included in the code; and in response to determining, using network information of the established connection, that a proximity of the first device to the second device satisfies a threshold:
receive metadata received in response to user input at the second device via the second device; and
modify the electronic document based on the metadata.

12. The system of claim 11, wherein the code further comprises an identifier of the electronic document.

13. The system of claim 11, wherein the code is a quick-response (QR) code, and the one or more processors are further configured to present the QR code at a display device.

14. The system of claim 11, wherein the set of instructions further cause the one or more processors of the first device to determine the proximity of the first device to the second device based on performing operations comprising detecting the second device using a wireless communication protocol or based on an internet protocol (IP) address of the second device.

15. The system of claim 11, wherein the set of instructions further cause the one or more processors of the first device to transmit the code in an electronic message.

16. The system of claim 11, wherein the set of instructions further cause the one or more processors of the first device to transmit the electronic document to a remote server responsive to modifying the electronic document.

17. The system of claim 11, wherein the code comprises a uniform resource locator (URL) that causes the second device to retrieve and execute an application that transmits a connection request to the first device.

18. The system of claim 11, wherein the metadata comprises one or more of a location of the second device, an identifier of the second device, and a timestamp of the input at the second device.

19. The system of claim 11, wherein the set of instructions further cause the one or more processors of the first device to modify the electronic document by performing operations comprising:
generating a digital fingerprint based on the metadata; and
embedding the digital fingerprint in the electronic document.

20. The system of claim 11, wherein the set of instructions further cause the one or more processors of the first device to transmit the metadata to a remote server, whereby the remote server validates an authenticity of the metadata.

* * * * *